United States Patent [19]

McDonald

[11] Patent Number: 5,440,785
[45] Date of Patent: Aug. 15, 1995

[54] BATTERY HANDLE ASSEMBLY

[76] Inventor: Kirk A. McDonald, 5153 Emerson Village, Indianapolis, Ind. 46032

[21] Appl. No.: 936,072

[22] Filed: Aug. 26, 1992

Related U.S. Application Data

[63] Continuation of Ser. No. 429,307, Oct. 31, 1989, abandoned.

[51] Int. Cl.6 ................ A47B 95/02; A45F 5/00
[52] U.S. Cl. .................. 16/114 R; 220/769; 294/903; 294/158; 429/187; 16/DIG. 15; 16/125
[58] Field of Search .... 16/114 R, DIG. 15, DIG. 24, 16/119, 125; 220/754, 758, 769; 429/187; 294/903, 149, 158

[56] References Cited

U.S. PATENT DOCUMENTS

| | | |
|---|---|---|
| 971,876 | 10/1910 | Apple . |
| 1,908,926 | 5/1933 | Severance . |
| 2,442,705 | 6/1948 | Meyer .............................. 220/94 R |
| 2,501,572 | 3/1950 | Marquez . |
| 2,913,275 | 11/1959 | La Rocca . |
| 3,093,515 | 6/1963 | Rector . |
| 3,339,794 | 9/1967 | Oberlander et al. . |
| 3,956,022 | 5/1976 | Fox . |
| 4,029,248 | 6/1977 | Lee . |
| 4,039,121 | 8/1977 | Crane .................................... 16/125 |

FOREIGN PATENT DOCUMENTS

| | | | |
|---|---|---|---|
| 214232 | 9/1956 | Australia . | |
| 0420735 | 12/1934 | France ............... | 180/68.5 |
| 1304447 | 12/1960 | France ............... | 429/187 |
| 1290147 | 9/1972 | United Kingdom ............... | 429/187 |
| 1494657 | 12/1977 | United Kingdom . | |
| 1591401 | 6/1981 | United Kingdom ............... | 429/187 |

Primary Examiner—P. Austin Bradley
Assistant Examiner—James Miner
Attorney, Agent, or Firm—Lockwood, Alex, Fitzgibbon & Cummings

[57] ABSTRACT

A battery handle assembly including an improved handle strap and a strap-support assembly for a storage battery which cooperatively enable the handle strap to be selectively and quickly attached to or detached from the battery's case and which facilitate the stable transport of the battery.

21 Claims, 3 Drawing Sheets

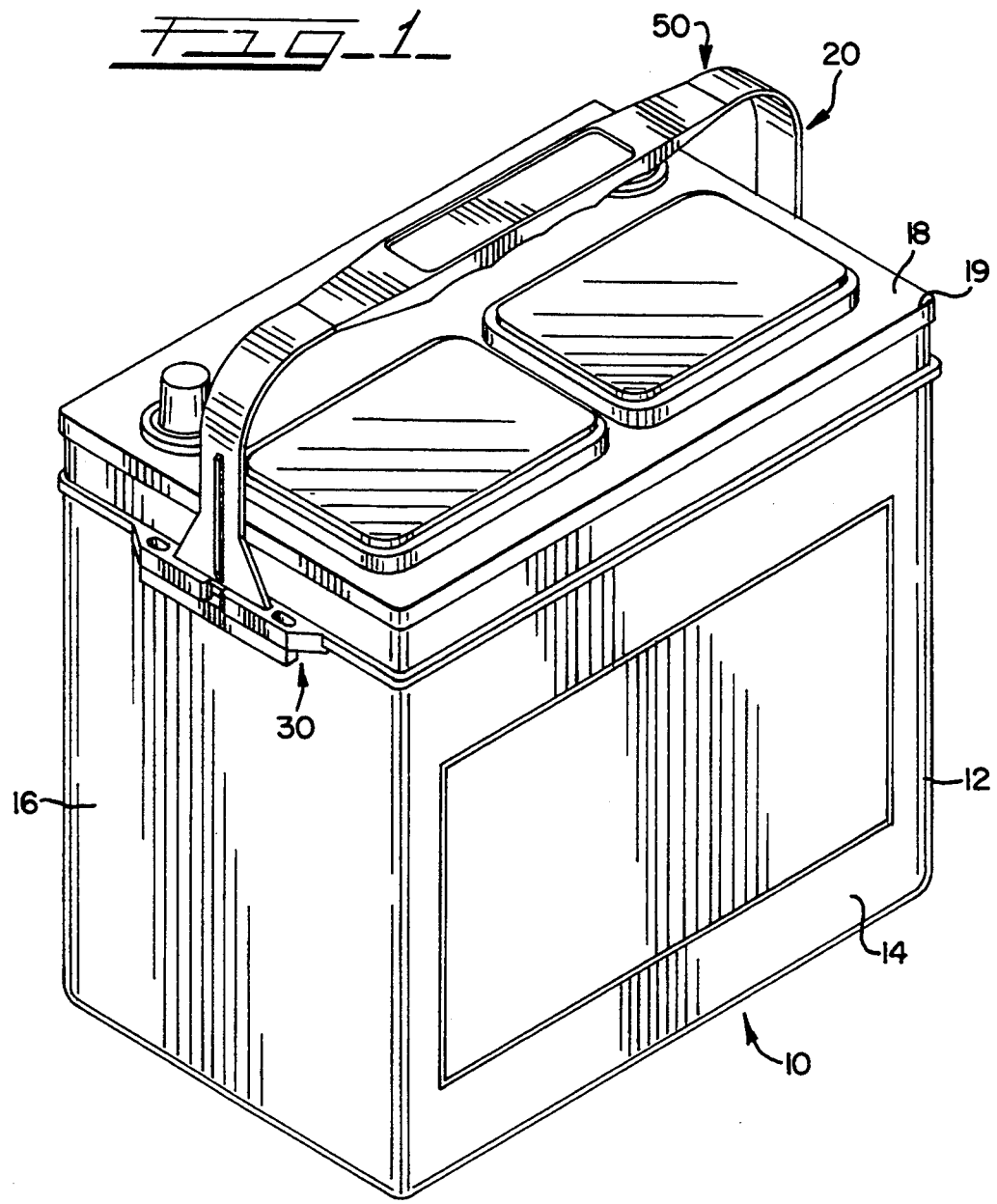

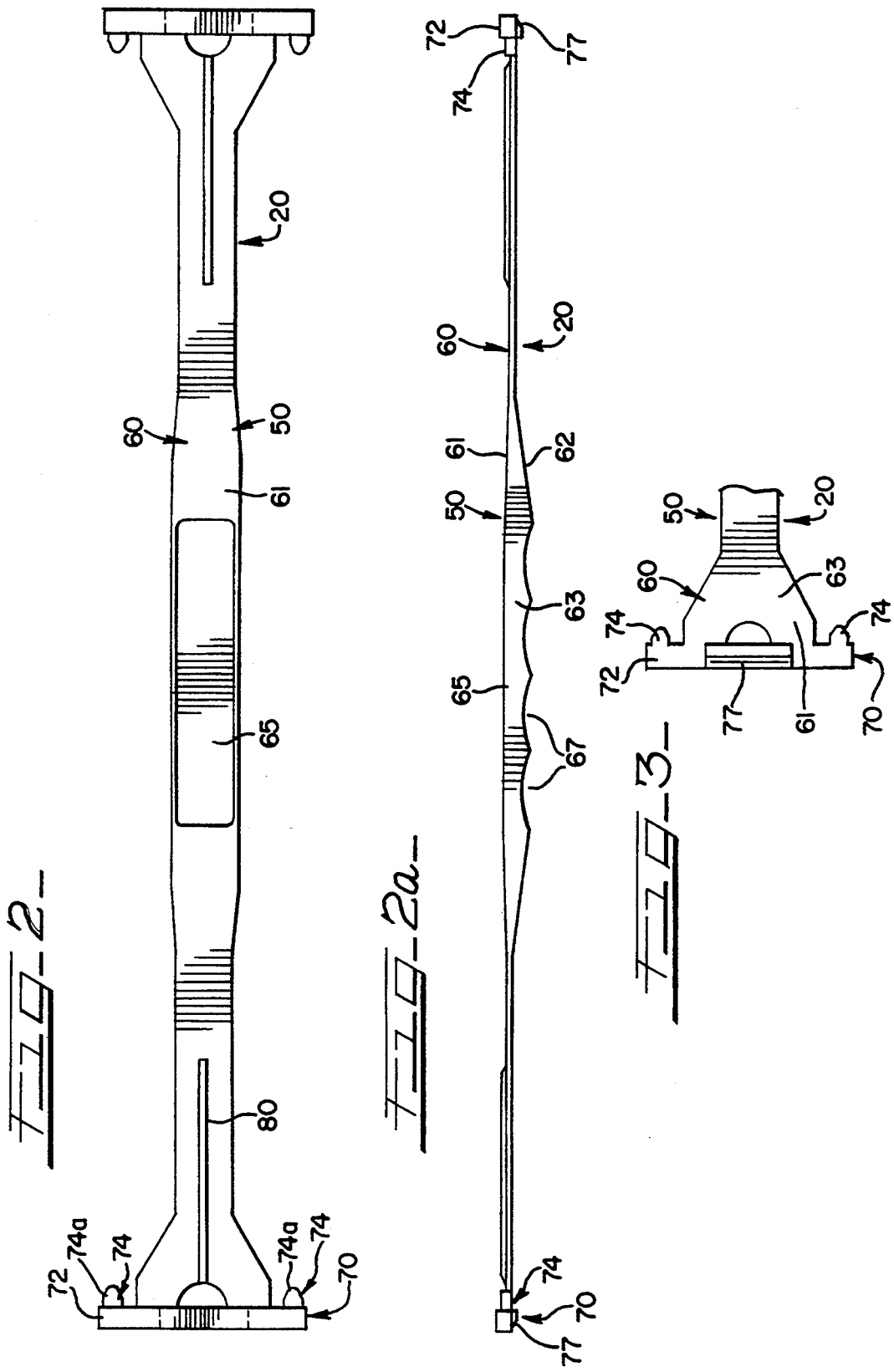

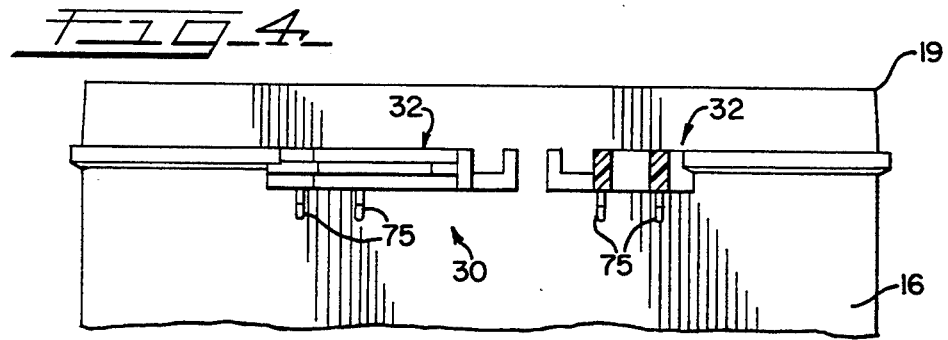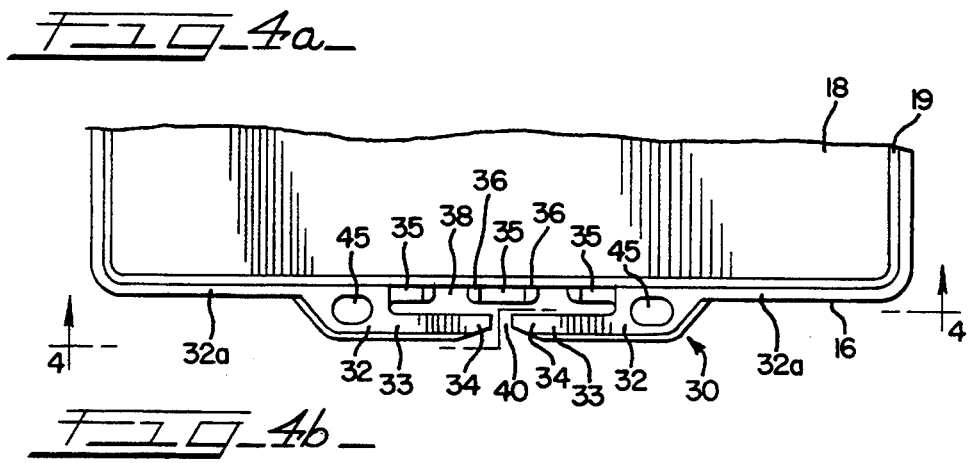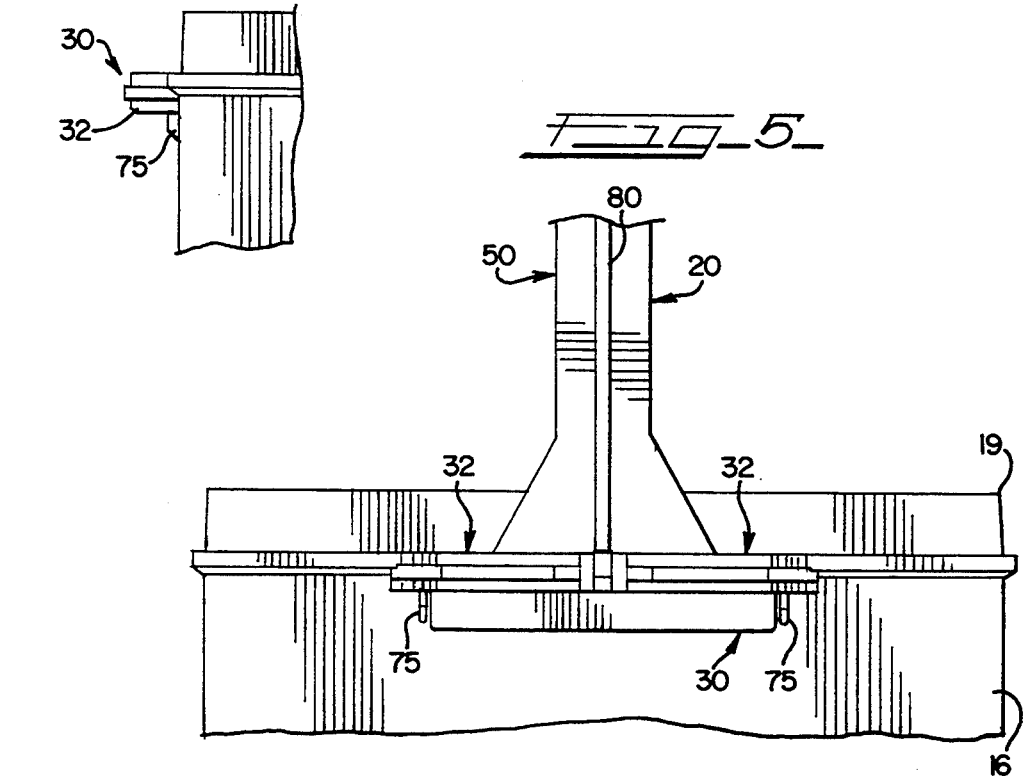

BATTERY HANDLE ASSEMBLY

This application is a continuation of application Ser. No. 07/429,307, filed Oct. 31, 1989.

BACKGROUND AND DESCRIPTION OF THE INVENTION

The present invention generally relates to a battery handle assembly, and, more particularly, to an improved handle strap and strap-support assembly for a storage battery which cooperatively enable the handle strap to be selectively and quickly attached to or detached from the battery's case and which facilitates the stable transport of the battery.

Storage batteries are conventionally heavy. To overcome this impediment and to improve the portability of conventional batteries, a variety of devices have been developed. Such devices generally comprise handles.

One type of handle—one whose shape is relatively fixed—is sometimes termed a grip. Grips are generally molded with or later secured to the battery's case, often as a symmetrically placed pair. A battery can be lifted and carried by its grips. However, a variety of disadvantages associated with grips limit their usefulness. For example, battery grips are generally located symmetrically on the battery case and require the user to employ two hands to carry the battery even when the weight of the battery does not warrant it. Furthermore, because grips are fixed in size, they do not always accommodate all possible hand sizes. Finally, conventional fixed handles generally project outward from the Walls of the battery's case thereby increasing its dimensional profile. In applications providing only limited sidewall clearance space, the resultant increase in the dimensional profile of the battery may completely preclude the use of the battery.

Another type of handle is not fixed in shape. Generally, such handles consist of a flexible member, such as a rope or strap, which is permanently attached to the battery. The usefulness of these handles is limited because they generally do not facilitate the stable transport of a battery without swaying or rocking. Also, because non-detachable flexible handles generally extend across the cover of the battery, access to the battery's terminals or vents is restricted. Furthermore, permanently fixed flexible handles limit the usefulness of the battery in areas providing only limited clearance space.

The present invention overcomes the many limitations associated with conventional battery handles. The present invention—a handle assembly—includes means by which a flexible handle may be quickly attached to and detached from a conventional battery case. As a result, the space problems associated with handles which are permanently fixed to the battery's case are overcome. Because the attachment means includes flanges which project in close conformity to the walls of the battery case and within which the flexible handle is slidably engaged, the sidewall clearance space required by the battery, even with handle detached, is not, resultingly, greatly increased. The swaying or rocking problem associated with conventional flexible or non-permanently attached handles is overcome by the present invention in that it includes stabilizing means. The stabilizing means includes a terminal bar which cooperatviely engages the attachment means to distribute the weight of the battery when it is being lifted and carried by the handle. Engaged in this fashion, a battery may be carried stably. Further stabilizing the battery during transit are ribs included as projections from the surface of the flexible handle of the present invention. When the battery is lifted by the handle, each rib slots into a gap. Lateral swaying and rocking of the battery during transit is prevented. The present invention allows a battery to be carried in a fixed and stable relationship and overcomes the space limitations of conventional battery handles.

It is, accordingly, a general object of the present invention to provide an improved storage battery handle assembly through the use of which the battery may be stably lifted and transported.

Another object is to provide a portable storage battery handle assembly which includes means by which a flexible handle may be selectively and quickly attached to and detached from the battery's case.

Another object of the present invention is to provide a battery handle support on a battery container that includes a flange outwardly extending from and in close conformity with the end walls of the container.

These and other objects of the present invention will be apparent from the following description of the invention, taken in conjunction with the accompanying drawings.

BRIEF DESCRIPTION OF THE DRAWINGS

In the course of this description, reference is made to the attached drawings, wherein:

FIG. 1 is a perspective view of the handle assembly according to the present invention with flexible handle attached to a conventional storage battery.

FIG. 2 is a top view of the flexible handle according to the present invention and as removed from the battery.

FIG. 2a is a side view of the handle illustrated in FIG. 2 according to the present invention.

FIG. 3 is a top view of the back side of one end of the handle according to the present invention.

FIG. 4 is a side view of the upper portion of one lateral wall of a battery viewed in a longitudinal direction showing the means by which the handle is attached to the battery case according to the present invention.

FIG. 4a is a top view of the attaching means illustrated in FIG. 4 according to the present invention.

FIG. 4b is a side view of the attaching means illustrated in FIG. 4 and FIG. 4a.

FIG. 5 is a side view of the handle assembly with flexible handle attached and secured in an upward position by the attaching means according to the present invention.

DESCRIPTION OF THE PRESENT INVENTION

The known storage battery 10 conventionally includes a rectangular case—designated by reference numeral 12 in FIG. 1—formed in part by a pair of longitudinal walls 14 aligned perpendicularly to a pair of lateral end walls 16 joined to an upper surface 18 at an edge 19.

The handle assembly according to the present invention is designated in FIGS. 1 through 5 as 20. To facilitate the stable transport of battery 10 without greatly increasing its dimensional profile, handle assembly 20 includes low profile attachment means 30 by which a flexible handle—such as the one designated as 50 in the figures—may be secured to the battery case 12.

Low profile attachment means 30 includes flanges 32, handle slot 38, gap 40, and apertures 45. Flanges 32 define the space in which a battery handle may be captured. Each flange 32 may be molded with or may be subsequently attached, such as through ultrasonic welding, to the battery case 12. In the embodiment illustrated in FIGS. 1, 4, 4a, 4b, and 5, a pair of flanges 32 are symmetrically molded to the upper portion of each lateral wall 16 near edge 19. To overcome the space problems associated with conventional battery handles, and to avoid greatly increasing the dimensional profile of a battery equipped with the present invention, flanges 32 project from and in close conformity to the end walls 16 of battery case 12. If desired, the end portions 32a of flanges 32 may be extended laterally along all or substantially all of the full width of end walls 16 to provide enhanced rigidity to said end walls, thereby serving to eliminate bowing thereof when the containers are transported on a production line during battery manufacture.

End point extensions 33—that terminate at end points 34—and discontinuous extensions 35— secured to the lateral walls, in part, by ridges 36—form with flanges 32 each handle slot 38. Between end points 34, gap 40 open. Perforating each flange 34 is an aperture 45.

Attachment means 30 may advantageously accept a variety of handles, such as a rope for use in certain marine, or other applications. In the embodiment illustrated in FIG. 1 through FIG. 5, handle 50 includes an elongate strap 60, a hand hold 65, and stabilization means 70.

Elongate strap 60 includes an upper surface 61, a lower surface 62, and edges 63. Elongate strap 60, as with other elements of the handle assembly 20, is preferably made of polyethylene-polypropylene copolymer. Elements made from this material are pliant yet highly resistant to mechanical failure and to corrosion from battery acid.

Hand hold 65 may be shaped and of the appropriate thickness to facilitate the lifting and transit of battery 10. To further accommodate the lifting and transport of battery 10, hand hold 65 may include depressions 67 configured to accommodate comfortably a user's hand.

Stabilization means 70 aid in the stabilization of the battery 10 during transit. Stabilization means 70 include a terminal bar 72 and a rib 80. Terminal bar 72 may be formed with or subsequently fixed to elongate strap 60. In the embodiment illustrated in FIGS. 1, 2, 2a, 3 and 5, a terminal bar 72 is molded to the ends of elongate strap 60 and extends perpendicularly to the general longitudinal axis of, and within the same general plane as strap 60.

When battery 10 is lifted by handle 50, each terminal bar 72 engages the attachment means 30 so that the weight of the battery 10 is stably distributed across the entire interface of the terminal bar 72 and the attachment means 30.

To further stabilize the battery 10 during transit, each terminal bar 72 may include studs 74. Studs 74 may be of any shape which may be correspondingly accepted at least in part within apertures 45 when handle 50 is lifted to its greatest vertical extent. In the embodiment illustrated in FIGS. 1, 2, 2a, 3 and 5, studs 74 are shown as having rounded keystone-like shaped ends 74a which may be accepted within appropriately shaped apertures 45. Studs 74 symmetrically project from the terminal bar 72 again to maximize the even distribution of the weight of battery 10 when it is carried by handle 50.

Acting to guide studs 74 and to reinforce the stable engagement of studs 74 within apertures 45 are guides 75. In the illustrated embodiment, guides 75 are vertical columns flanking the lower opening of each aperture 45 and extending from the flanges 34 downward.

To prevent the uneven rubbing of handle 50 against the battery case 12 and to aid in the further stable distribution of weight across the handle 50 when it is used to carry battery 10, terminal bars 72 may include a rear elevation 77. Rear elevation 77 may be formed with or affixed to handle 50 and, as illustrated in FIGS. 2a and 3a, include a rectangular length of material raised from the lower surface 62 of handle 50. When handle 50 is fully raised within the attachment means 30, elevation 77 contacts lateral wall 16 of battery case 12 and is captured under discontinuous extensions 35.

Rib 80 further facilitates the stabilization of, and specifically prevents the lateral rocking or sway of the battery 10 while it is being carried. Rib 80 includes a ridge of material molded with or affixed to elongate strap 60 and of sufficient height and size so that, when handle 50 is received within handle slot 38, rib 80 is cooperatively captured between end points 34 and within gap 40. In the embodiment illustrated in FIG. 1 through FIG. 3 and FIG. 5, two symmetrically placed ribs 80 project from the upper surface 61 of elongate strap 60 and extend from each terminal bar 72 to the approximate point at which the elongate strap 60 naturally bends from a generally vertical attitude to a generally horizontal attitude. Ribs 80 placed in this fashion and of this length, will continue to be engaged within gap 40 and will continue to prevent lateral rocking or swaying of the battery 10 even if elongate strap 60 is for whatever reason, suddenly displaced downward during the transit of battery 10.

The attachment and removal of the handle 50 of the present invention from the battery 10 may be easily accomplished as follows. Because of its flexibility, elongate strap 60 may be turned so that its edge 63 may be inserted first through gap 40 and until the entire width of the strap 60 is slidably engaged within handle slot 38. In embodiments such as the illustrated one, this procedure is repeated for the attachment of the other end of handle 50 within the attachment means 30. As attached, each terminal bar 72 will evenly engage each flange 32 and studs 74 will become engaged within the apertures 45 when battery 10 is lifted by handle 50. To detach handle 50, the elongate strap 60 is simply depressed downward so that an edge 63 may be moved out through one gap 40. In embodiments such as the illustrated ones, this procedure is repeated for the other side.

It is to be understood that the above descriptions refer to particular embodiments of the invention. Other embodiments of the invention will be readily apparent to one skilled in the storage battery art.

Having fully described my invention, I hereby claim:

1. A handle assembly for a storage battery container, said container having opposed vertical end walls, side walls and a cover forming a top surface thereof, said handle assembly comprising:

a carrying strap adapted to be detachably connected to said container, said strap including an elongate body having a longitudinal axis and a pair of container-attachment portions at opposite ends thereof, each of said container-attachment portions including a terminal bar integrally formed therewith and generally perpendicularly disposed with respect to said longitudinal axis; and, a pair of integral rigid strap supporting flanges respectively projecting laterally outwardly from and in close conformity to either said end walls or side walls of said container adjacent said top surface, each of said flanges including a pair of end point extensions integrally formed therewith which define a slot for the slidable receipt of one of the container-attachment portions of said strap, end points of said end point extensions of said each of said flanges defining a gap which is sized to permit selective strap insertion into or removal from said slot, and said each of said flanges having a bottom surface, said bottom surface sized and shaped to receive an upper surface of each of the terminal bars of the container-attachment portion of the strap associated therewith when said strap is lifted.

2. A handle assembly according to claim 1 further including a hand hold, said hand hold being generally centrally located along said elongate strap to facilitate the carrying of said batting by one hand.

3. A handle assembly according to claim 1 wherein said handle assembly is made from a compliant and acid resistant material.

4. A handle assembly according to claim 1 wherein said handle assembly is made from an ethylene-propylene copolymer.

5. A handle assembly for a storage battery container, said container having opposed vertical end walls, side walls and a cover forming a top surface thereof, said handle assembly comprising:
   a carrying strap adapted to be detachably connected to said container, said strap including an elongate body having a longitudinal axis and a pair of container-attachment portions at opposite ends thereof, each of said container-attachment portions including a terminal bar integrally formed therewith and generally perpendicularly disposed with respect to said longitudinal axis; and,
   a pair of integral rigid strap supporting flanges respectively projecting laterally outwardly from and in close conformity to either said end walls or side walls of said container adjacent said top surface, each of said flanges including a pair of end point extensions integrally formed therewith which define a slot for the slidable receipt of one of the container-attachment portions of said strap, end points of said end point extensions of each of said flanges defining a gap which is sized to permit selective strap insertion into or removal from said slot, and said each of said flanges having a bottom surface, said bottom surface of said each of said flanges includes an aperture laterally disposed with respect to said slot, said bottom surface being in general conformity with an upper surface of the terminal bar of the container-attachment portion of the strap associated therewith when said strap is lifted.

6. A handle assembly according to claim 5 wherein each of said terminal bars include studs, said studs projecting upwardly from said terminal bars and being sized to be received within said apertures when said handle is upwardly extended.

7. A handle assembly according to claim 2 wherein said strap includes ribs which extend longitudinally along at least one surface and adjacent each of the container-attachment portions of said strap, said ribs being sized to be received within the gap in each of said flanges and to generally restrict laterally movement of said container.

8. A handle assembly for a storage battery, said storage battery having opposed vertical end walls, side walls and a cover forming a top portion thereof, said handle assembly comprising:
   a carrying strap adapted to be detachably connected to said container, said strap including an elongate body having a longitudinal axis and a pair of container-attachment portions at opposite ends thereof, each of said container-attachment portions including a terminal bar integrally formed therewith, each of said terminal bars being generally perpendicularly disposed with respect to the longitudinal axis of said strap and including a pair of studs upwardly extending therefrom, said strap including also a pair of stabilizing ribs longitudinally extending parallel to said longitudinal axis of said strap from said each of said pair of container-attachment portions thereof and along one surface of said strap; and,
   a pair of integral flanges respectively projecting laterally outwardly from each of said end walls of said storage battery and adjacent to the top portion thereof, each of said flanges including a pair of outer flange extensions integrally formed therewith, said extensions defining a slot, said slot sized and shaped to allow said elongate body of said strap to slide therethrough and for the slidable engagement of one of the container-attachment portions of said strap, said outer flange extensions of each of said flanges terminating approximately adjacent to a longitudinal center of said slot to define a gap, said gap sized and shaped to permit said elongate body of said strap to be inserted into or to be removed from said slot and to accommodate one of said pair of stabilizing ribs, said each of said flanges further including a bottom surface which includes a pair of apertures sized and shaped to receive the upwardly projecting studs of the terminal bar of said each of said pair of container-attachment portions of the strap associated therewith, whereby said carrying strap as fully inserted through said gap and into said slot and when lifted to carry said storage battery, said each of said pair of container attachment portions is engaged by said each of said flanges, said studs are received in said apertures, and said ribs are captured within said gap to prevent lateral rocking or swaying of the battery while being carried.

9. A handle assembly according to claim 8 wherein said strap includes a grasping portion shaped to accommodate the hand of a person carrying said battery.

10. A handle assembly according to claim 8 wherein the elongate body of said carrying strap is of generally uniform width and said container-attachment portions include an outwardly tapered extension thereof.

11. A handle assembly according to claim 8 wherein said handle assembly is made from a compliant and acid resistant material.

12. A handle assembly according to claim 8 wherein said handle assembly is made from an ethylenepropylene copolymer.

13. A handle assembly for a battery, said battery having a plurality of cells in a container and a cover with positive and negative battery terminals and vent caps projecting generally perpendicularly above a top surface of said cover, said handle assembly comprising:

an elongate strap, said elongate strap having a terminal bar projecting from each end of said strap and generally perpendicularly to a longitudinal axis of said strap, means for attaching said strap to said battery, said attaching means including discontinuous flanges projecting from and in close conformity to said container, said container and said discontinuous flanges defining a slot therebetween, the adjacent ends of said discontinuous flanges defining a gap sized to permit selective insertion or removal of said strap, means for stabilizing said battery during transport, said stabilizing means including a rib projecting from a surface of said elongate strap, said attaching means and stabilizing means cooperating with each other so that when said battery is carried by said strap said terminal bars engage said flanges to distribute the weight of the battery across the upper surface of said terminal bars which are in contact with said flanges and said ribs are slidably received within said gap to prevent lateral swaying of said battery.

14. A handle assembly according to claim 13 wherein said stabilizing means further includes studs, said studs projecting from a surface of said terminal bar and being sized to be cooperatively captured within apertures formed in said flanges.

15. A battery container for a storage battery having an improved carrying handle support, said container including opposed vertical end walls, side walls and a top portion, said improved carrying handle support comprising:

a pair of integral flanges respectively projecting laterally outwardly from either said end walls or said side walls of said container adjacent said top surface, each of said flanges including a pair of outer flange extensions integrally formed therewith which define a slot for the slidable receipt of one end of a carrying strap, the end portions of said outer flange extensions of each of said flanges defining a gap which is sized to permit selective insertion or removal of such strap, each of said flanges including also a pair of apertures laterally disposed with respect to said slot.

16. An improved carrying strap for a storage battery, said storage battery including a container having opposed vertical end walls, side walls and a cover which forms a top surface thereof, said container including strap-support flanges, each of said flanges having a strap-receiving slot and a pair of apertures laterally disposed with respect to said slot, each of Said flanges further including an access gap sized to permit selective insertion or removal of said strap and retaining capture of said strap to prevent unintentional dislocation of said strap from said slot, said strap comprising:

an elongate body portion having a generally uniform width, said body portion defining a longitudinal axis of said strap, the ends of said elongate body portion extending into outwardly tapered portions which in turn respectively extend into a pair of terminal bars generally perpendicularly disposed with respect to the longitudinal axis of said body portion, the outer portions of each of said terminal bars including a pair of studs which are sized and positioned to be received within the apertures of the strap-support flange on said container associated therewith.

17. A carrying strap according to claim 16 wherein said strap includes ribs which extend longitudinally on the strap along at least the tapered portions thereof, said ribs being sized and located to be slidingly received within the access gap of each of the strap-support flange on the container associated therewith.

18. A handle attachment for a storage battery, said storage battery including a container, said container having generally vertical opposing walls, said walls including longitudinal walls aligned generally perpendicularly to lateral end walls, said walls joined to a generally horizontal upper surface at an edge, said handle attachment comprising:

rigid flanges fixed approximate to said edge, each of said flanges include apertures sized to accept studs projecting from a handle, each of said flanges including a gap opening between end points of said flange and onto a slot, said gap sized such that a portion of said handle can pass therethrough and into said slot, said slot opening add sized such that said handle can slide generally vertically therethrough, whereby said handle can be easily attached to said storage battery by passing said portion of said handle through said gap and into said slot for the stable transportation of said battery.

19. A handle for a storage battery, said handle comprising:

an elongate strap, said strap sized and shaped to be inserted within attachment means projecting outwardly from an exterior vertical surface of said battery, said strap having an inner surface and an outer surface;

a hand hold; and stabilization means, said stabilization means including terminal bars extending perpendicularly to a longitudinal axis of and coplanar with said strap, said stabilization means further including ribs projecting from said outer surface of said strap, whereby said ribs are cooperatively captured within said attachment means when said battery is lifted by said hand hold of said handle.

20. A handle for a storage battery, said handle comprising:

an elongate strap;

a hand hold; and stabilization means, said stabilization means including terminal bars extending perpendicularly to a longitudinal axis of and coplanar with said strap, said stabilization means including studs projecting from said terminal bars and ribs projecting from said strap, said studs and said ribs are sized to be accepted within attachment means when said battery is lifted by said handle.

21. The handle according to claim 20, wherein said terminal bars include rear elevations projecting from an inner surface of said elongate strap, said rear elevations contacting lateral walls of said storage battery when said battery is lifted by said handle.

* * * * *